（12) United States Patent
Takayama et al.

(10) Patent No.: US 6,535,933 B1
(45) Date of Patent: Mar. 18, 2003

(54) INFORMATION PROCESSING SYSTEM DEVICE CONTROL METHOD, INFORMATION PROCESSING SYSTEM DEVICE AND SOFTWARE STORAGE MEDIUM

(75) Inventors: Norihisa Takayama, Kobe (JP); Satoshi Matsuo, Otsu (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/347,463

(22) Filed: Jul. 6, 1999

(30) Foreign Application Priority Data

Jul. 7, 1998 (JP) .......................................... 10-191440

(51) Int. Cl.[7] ............................. G06F 3/00; G06K 15/00
(52) U.S. Cl. ............................. 710/14; 710/9; 710/10; 710/8; 358/1.11; 358/1.13
(58) Field of Search ....................... 710/8, 9, 10, 14; 358/1.11, 1.13

(56) References Cited

U.S. PATENT DOCUMENTS

| | | | | |
|---|---|---|---|---|
| 5,165,014 A | * | 11/1992 | Vassar | 358/1.13 |
| 5,561,744 A | * | 10/1996 | Sugaya et al. | 358/1.13 |
| 5,706,413 A | * | 1/1998 | Takabayashi et al. | 358/1.11 |
| 5,835,772 A | * | 11/1998 | Thurlo | 395/705 |
| 6,009,480 A | * | 12/1999 | Pleso | 710/8 |

FOREIGN PATENT DOCUMENTS

JP         09069912         11/1997

OTHER PUBLICATIONS

IBM Technical Disclosure Bulletin, vol. No. 32, Issue No. 4b, Sep. 1, 1989, US, pp. 315–316.*

* cited by examiner

*Primary Examiner*—Jeffrey Gaffin
*Assistant Examiner*—Tammara Peyton
(74) *Attorney, Agent, or Firm*—McDermott, Will & Emery

(57) ABSTRACT

A device control method for an information processing system connecting a host and devices via a communications means, said device control method comprising a step of accessing a device from a host, a step of downloading to a host from a device accessed by the host the control software for controlling the device having a plurality of operating modes and capable of being operated from the host side, a step of executing the control software downloaded by the host, and a step of setting the operating mode of the control software in accordance with the operating mode of the device via the execution of the control software.

8 Claims, 3 Drawing Sheets

INFORMATION PROCESSING SYSTEM DEVICE CONTROL METHOD, INFORMATION PROCESSING SYSTEM DEVICE AND SOFTWARE STORAGE MEDIUM

CROSS-REFERENCE TO RELATED APPLICATIONS

This application is based on Application No. HEI 10-191440 filed in Japan, the content of which is hereby incorporated by reference.

BACKGROUND OF THE INVENTION

1. Field of the Invention

The present invention relates to an information processing system device control method, an information processing system device and software storage medium.

2. Description of the Related Art

Conventional information processing system device control methods provide within the device the control software which can operate under different operating systems (OS) such as Windows, Unix, Macintosh and the like, and this control software is downloaded from the device to a host as necessary to control the device by having the control software executed on the host side. In such information processing system device control methods, the specific control software for each device need not be installed in the host, and the control software corresponding to a device being used need not be specified on the host side.

A disadvantage arises in such information processing system device control methods in that the operation mode of the host must be set in accordance with the operation mode (e.g., language mode) of the device being used.

SUMMARY OF THE INVENTION

An object of the present invention is to provide an information processing system device control method, an information processing system device and software storage medium capable of controlling a device from a host in an optimum operation mode by automatically setting the operation mode of the host in accordance with the operation mode of the device.

These objects are attained by the information processing system device control method of the present invention, which is a device control method for an information processing system connecting a host and devices via a communications means, said device control method comprising:

the step of accessing a device from a host;

the step of downloading to a host from a device accessed by the host the control software for controlling the device having a plurality of operating modes and capable of being operated from the host side;

the step of executing the control software downloaded by the host; and the step of setting the operating mode of the control software in accordance with the operating mode of the device via the execution of the control software.

The information processing system device of the present invention is provided with a memory for storing the control software used in the information processing system device control method.

these and other objects, advantages and is features of the invention will become apparent from the following description thereof taken in conjunction with the accompanying drawings which illustrate specific embodiments of the invention.

BRIEF DESCRIPTION OF THE DRAWINGS

In the following description, like parts are designated by like reference numbers throughout the several drawings.

DETAILED DESCRIPTION OF THE PREFERRED EMBODIMENTS

The preferred embodiments of the information processing system device control method, the information processing system device and software storage medium of the present invention are described in detail hereinafter with reference to the accompanying drawings.

Figure 1A:
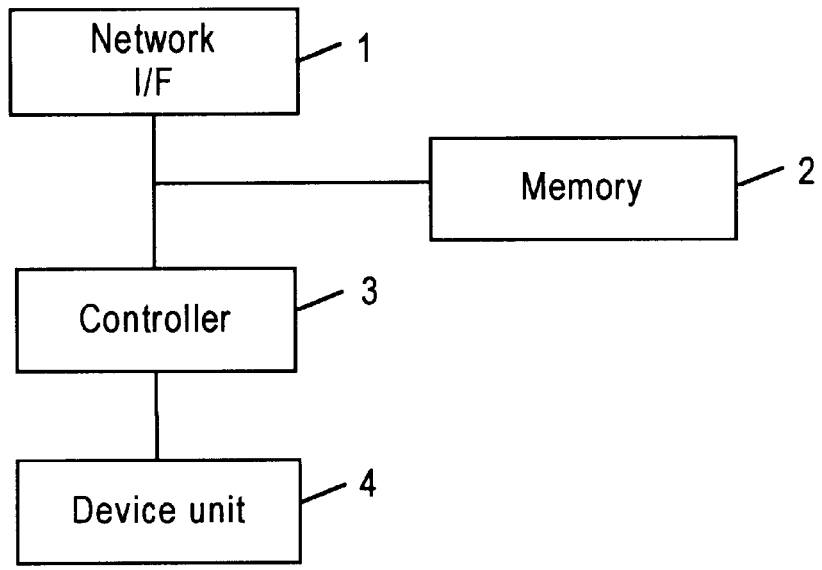
FIG. 1A is a block diagram of a device using the information processing system device control method of an embodiment of the present invention.

FIG. 1A is a block diagram of a device using the information processing system device control method of an embodiment of the present invention. Reference number 1 refers to a network interface for controlling communications with a host connected via the network and which is used as a communications means, reference number 2 refers to a control software memory for storing the control software for controlling a device from the host side, reference number 3 refers to a controller for controlling the functions of the device, and reference number 4 refers to the essential device unit of the device itself.

Figure 1B:
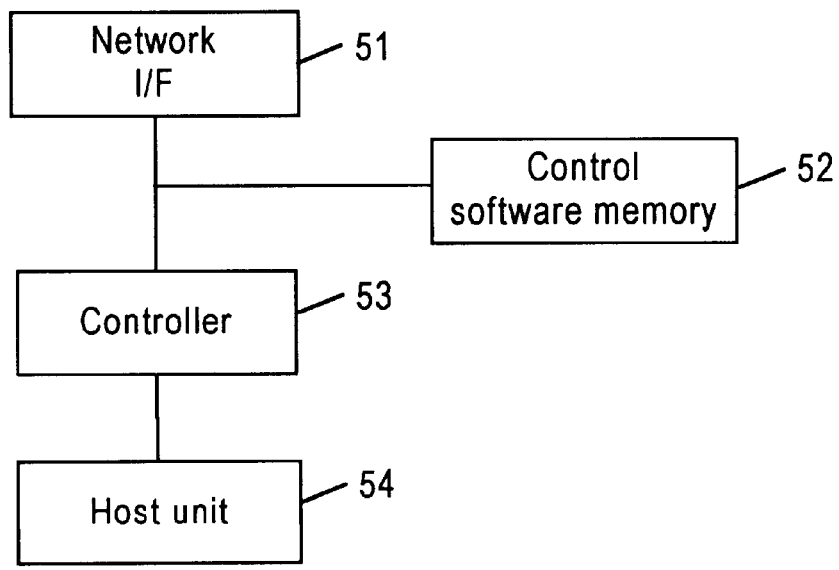
FIG. 1B is a block diagram of a host using the information processing system device control method of an embodiment of the present invention.

FIG. 1B is a block diagram of the host. Reference number 51 refers to a network interface for controlling communication with a device connected via a network, reference number 52 refers to a memory (ROM, RAM, hard disk) for storing the control software received from a device and control software stored beforehand for controlling the host, reference number 53 refers to a controller for controlling the functions of the host, and reference number 54 refers to other essential parts (display, key input unit, recording medium installation unit) of the host.

Figure 2:
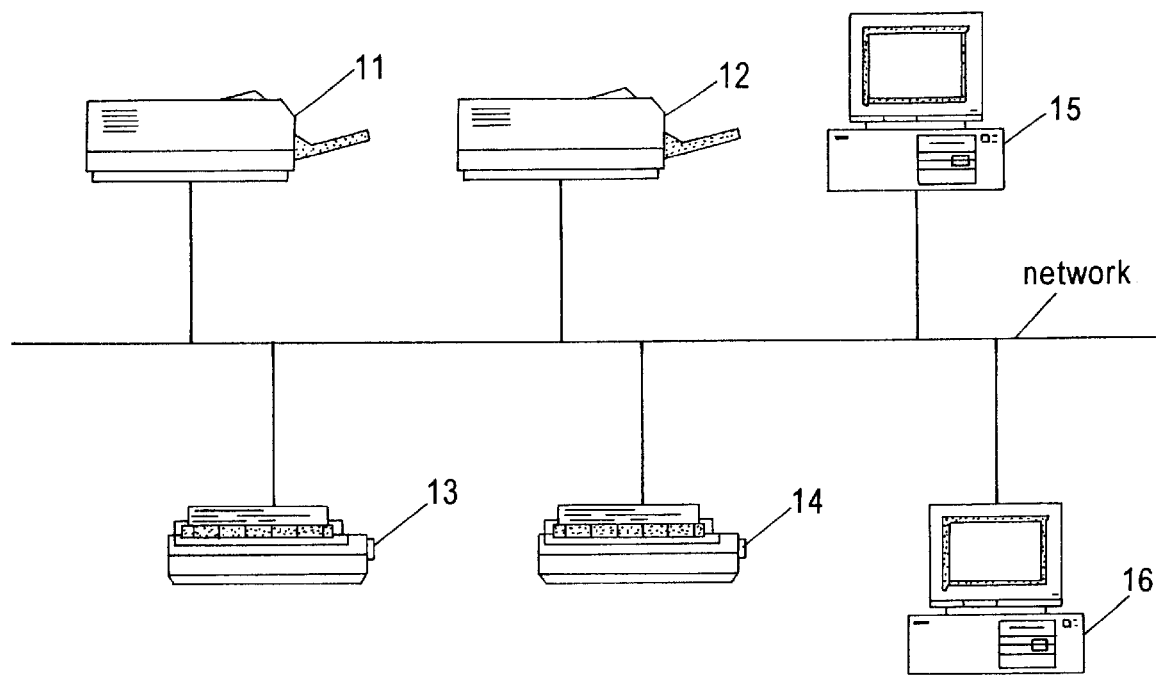
FIG. 2 briefly shows the construction of an information processing system connecting the device and host via a network.

FIG. 2 briefly shows the construction of an information processing system connected via a network to a plurality of devices 11 through 14, and hosts 15 and 16. In FIG. 2, the devices 11 through 14 are printers, and the hosts 15 and 16 are personal computers.

In the information processing system of the aforesaid construction, when the host 15 (or 16) accesses one device among the devices 11 through 14, the control software stored in the control software memory 2 of the accessed device is downloaded to the host 15 (or 16). Thereafter, the control software is started on the host.

Figure 3A:
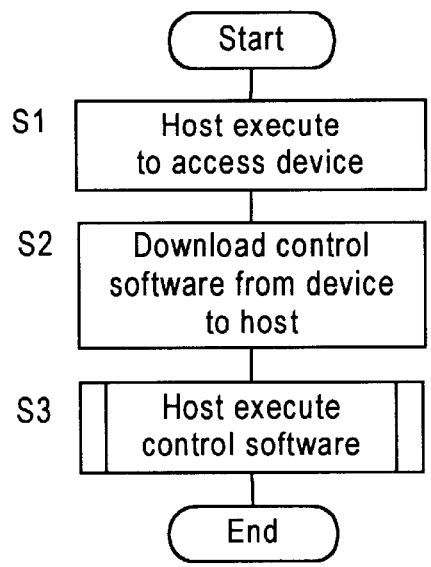
FIG. 3A is a flow chart describing the operation of the information processing system.
Figure 3B:
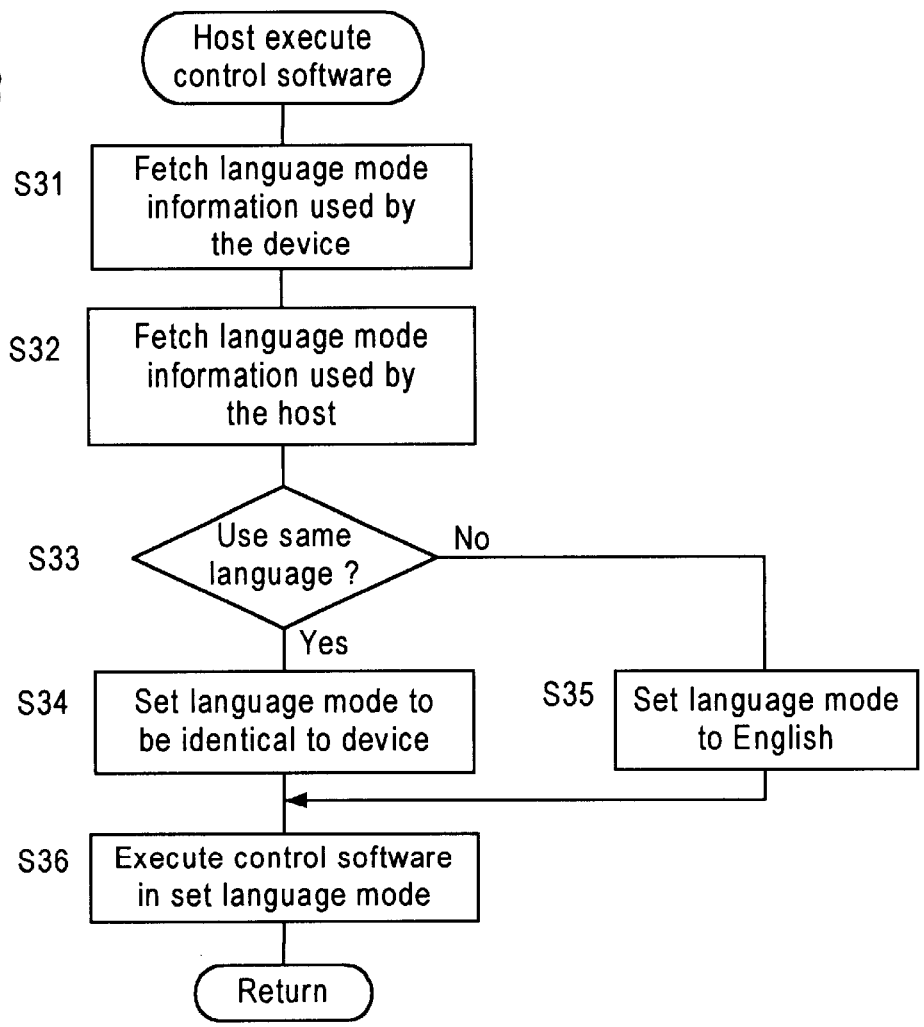
FIG. 3B is a flow chart showing details of the control software execution on the host side in FIG. 3A.

FIG. 3A is a flow chart showing the main routine for operating the information processing system of FIG. 2, and FIG. 3B is a flow chart showing details of the control software execution on the host side shown in FIG. 3A. The operation of the information processing system shown in FIGS. 3A and 3B is described below.

First, in step S1, a connection process for communication is executed to access a device and initialize flags and the like required to download the control software.

In step S2, the control software is downloaded from the device to the host.

In step S3, the host executes the downloaded control software.

Then, when the control software downloaded to the host in step S3 is started, the language mode information used by the device is fetched in step S31. Although in the present example the language information is fetched after the software has been downloaded and the device has been accessed, the language information also may be transmitted to the host when the control software is downloaded from the device in step S2 of FIG. 3A.

In step S32, the language mode information used by the host is fetched.

The routine then advances to step S33, where it is determined whether or not the same language is used based on the language mode information fetched in steps S31 and S32. When the same language mode is being used, the routine continues to step S34, and the language mode of the control software is set to be identical to the device settings fetched in step S31, then the routine continues to step S36.

On the other hand, when the same language mode is not used, the routine continues to step S35, and the language mode of the control software is set to English. The reason for setting the language mode to English at this time is because of the widespread use of English, and to reduce character set errors when displaying other languages.

Finally, in step S36, the control software is executed in the set language mode.

In this the information processing system device control method, devices can be used in common in an environment of a plurality of hosts by storing within the devices the control software commonly usable by each host, and the software specific to each device need not be installed beforehand in each host.

For example, when the devices 11 through 14 are printers corresponding to a plurality of languages, the control software is a printer management utility corresponding to a plurality of languages, and the host computers 15 and 16 are personal computers, generally printers which operate in a German language environment will use German as the printer language, and German language will be displayed ion the operation panel. When the one of the functions of the printer management utility is to the operation panel display function of the printer, the printer management utility is executed in the German language which is the same language as the printer language given the likelihood that the user using the host is using the same language as the printer language.

Accordingly, the device operation mode can be set automatically without setting the host operation mode to correspond to the device operation mode, so as to control the device from the host in the optimum operation mode.

Although the present embodiment has been described in terms of an information processing system using printers as the devices 11 through 14 and personal computers as the hosts 15 and 16, the present invention is not limited to these devices and hosts, inasmuch as devices may include scanners and the like provided with an operation panel, and hosts may include general purpose computers and the like.

Although the present embodiment has been described in terms of a device control method for an information processing system connecting the devices 11 through 14 and the hosts 15 and 16 via a network used as a communications means, the present invention also is applicable to information processing systems using various modes of communications means such as wide area networks, local area networks and the like.

The language mode is set as the operation mode of the device and host in the present embodiment, but the operation mode is not limited to the language mode inasmuch as the mode may be the execution of software for operating in accordance with the performance of each host.

Although the control software memory 2 is used as the control software storage medium in the present embodiment, the memory is not limited to this inasmuch as a floppy disk, or other storage medium may be used. For example, a separate network card may be prepared and installed in the device as necessary for use as a storage medium for storing the control software.

As can be understood from the above description, the information processing system device control method of the present invention is a device control method for information processing systems connecting hosts and devices via a communications means, wherein control software which is operational on the host side is downloaded to the host from a device having a plurality of operation modes accessed by the host, the downloaded control software is executed by the host, and the operation mode of the control software is set in accordance with the operation mode of the device via the executed control software, and the device is controlled from the host based on the control software.

Accordingly, the operation mode of the device is determined, and the control software operating on the host sets the optimum operation mode without the user setting the operation mode on the host side.

Although preferred embodiment of the invention have been described in the foregoing detailed description and illustrated in the accompanying drawings, it will be understood that the invention is not limited to the embodiment disclosed, but is capable of numerous rearrangements, modifications and substitutions of parts and elements without departing from the spirit of the invention. Accordingly, the present invention is intended to encompass such rearrangements, modification and substitutions of parts and elements as fall within the spirit and scope of the invention.

What is claimed is:

1. A device control method for an information processing system connecting a host an d devices via a communication means, said device control method comprising the steps of:

accessing a device from a host;

downloading to a host from a device accessed by the host a control software for controlling the device having a plurality of operating modes and capable of being operated from the host side; and executing the control software downloaded by the host, executing the control software including fetching operating mode information used by the device, fetching operating mode information used by the host, determining whether or not the fetched operating mode information indicates that a same operating mode is used by the device and the host, when a result of determining is that the same operating is used by the device and the host, setting an operating mode of the control software to be identical to the of the device, and when a result of determining is that a different operating mode is used by the device and the host, setting the operating mode of the control software to a predetermined operating mode.

2. The method according to claim 1, wherein the device is provided with a memory for storing the control software used in the information processing system device control method.

3. The method according to claim 1, wherein the plurality of operating modes includes a plurality of language modes.

4. The method according to claim 3, further comprising the step of:

displaying by a language that is set via setting the operating mode.

5. An information processing system connectng a host and devices via a communications means, said system comprising:

a device having a plurality of operating modes; a host having a plurality of operating modes; and a controller which directs execution of the following functions, fetching operating mode information used by the device, fetching operating mode information used by the host, determining whether or not the fetched operating mode information indicates that a same operating mode is used by the device and the host, when a result of determining is that the same operating is used by the device and the host, setting an operating mode of a control software for controlling the device to be identical to the of the device, and when a result of determining is that a different operating mode is used by the device and the host, setting the operating mode of the control software to a predetermined operating mode.

6. The system according to claim 5, wherein the control software is downloaded to the host from the device.

7. A storage medium for storing program software of an information processing system connecting a host and devices via a communications means, wherein the storage medium stores a storage program directing functions including:

accessing a device from a host;

downloading to the host from the device accessed by the host a control software for controlling the device having a plurality of operating modes and capable of being operated from the host side; and executing the control software downloaded by the host, executing the control software including fetching operating mode information used by the device, fetching operating mode information used by the host, determining whether or not the fetched operating mode information indicates that a same operating mode is used by the device and the host, when a result of determining is that the same operating mode is used by the device and the host, setting an operating mode of the control software to be identical to the of the device, and when a result of determining is that a different operating mode is used by the device and the host, setting the operating mode of the control software to a pre determined operating mode.

8. A device control method for an information processing system connecting a host and devices via a communication means, said device control method comprising the steps accessing a device from a host;

downloading to a host from a device accessed by the host a control software for controlling the device having a plurality of operating modes and capable of being operated from the host side, the plurality of operating modes including a plurality of language modes; and executing the control software downloaded by the host, the step of executing the control software including fetching from the device language mode information used by the device, fetching from the host language mode information used by the host, determining whether or not the fetched language mode information indicates that a same language is used by the device and the host, when a result of determining is that the same language is used by the device and the host, setting a language mode of the control software to be identical to the of the device, and when a result of determining is that a different language is used by the device and the host, setting the language mode of the control software to a predetermined language.

* * * * *